United States Patent [19]

Nagler et al.

[11] Patent Number: 5,414,695

[45] Date of Patent: May 9, 1995

[54] METHOD FOR MONITORING EXISTING TELEPHONE CONNECTIONS, PARTICULARLY PERMANENTLY SWITCHED TELEPHONE CONNECTIONS

[75] Inventors: Werner Nagler, Hohenschaeftlarn; Bernhard Gloess, Munich, both of Germany

[73] Assignee: Siemens Aktiengesellschaft, Munich, Germany

[21] Appl. No.: 145,092

[22] Filed: Nov. 3, 1993

[30] Foreign Application Priority Data

Nov. 20, 1992 [EP] European Pat. Off. ............ 92119844

[51] Int. Cl.⁶ ...................... H04L 12/26; H04L 1/12; H04L 1/24
[52] U.S. Cl. .................................. 370/15; 370/16; 371/20.4; 371/68.2
[58] Field of Search ................ 370/13, 16, 16.1, 58.1, 370/58.2, 58.3, 15; 371/20.1, 20.4, 20.5, 67.1, 68.2

[56] References Cited

U.S. PATENT DOCUMENTS

| | | | |
|---|---|---|---|
| 4,387,456 | 6/1983 | Creteau | 370/13 |
| 4,821,256 | 4/1989 | Schmidt et al. | 370/13 |
| 4,995,042 | 2/1991 | Güthaus et al. | 371/68.2 |

FOREIGN PATENT DOCUMENTS 0250936  7/1988  European Pat. Off. .

*Primary Examiner*—Wellington Chin
*Attorney, Agent, or Firm*—Hill, Steadman & Simpson

[57] ABSTRACT

In a method for monitoring existing telephone connections, particularly permanently switched telephone connections, the information that correspond to one another and come from the redundant switching network halves (SN0, SN1 ) are compared to one another. The information intended for forwarding to connected lines is branched in the interface (LTU) at the line side into a separate time channel (K0) and is transmitted back to the interface (LIU) at the switching network side and are compared thereat to said information. Information coming from the lines is branched into the separate time channel and is transmitted in parallel with the original information to the interface (LIU) at the switching network side. The branched information is compared to the original information in the interface (LIV) at the switching network side. The procedures ensue time-channel-by-time-channel.

6 Claims, 3 Drawing Sheets

METHOD FOR MONITORING EXISTING TELEPHONE CONNECTIONS, PARTICULARLY PERMANENTLY SWITCHED TELEPHONE CONNECTIONS

BACKGROUND OF THE INVENTION

The present invention is directed to a method for monitoring existing telephone connections, particularly permanently switched telephone connections.

In the prior art monitoring of telephone connections for error-free through-connection has been undertaken in the form of a call-associated cross office check (COC). Check bit patterns are transmitted after the implemented call set up from the line interface and line location of the calling subscriber to the line interface and line location of the called subscriber. The check bit patterns are mirrored back from the latter to the line location of the calling subscriber before a through-connection to the other subscriber is established. A through-connection or continuity fault is present insofar as the received check bit patterns do not correspond to the transmitted check bit patterns. A limiting of the monitoring of telephone connections to the described monitoring undertaken before the actual through-connection is not satisfactory, particularly for permanently through-connected connections, what are referred to as nailed-up connections (NUC connections). An interruption of such connections and a subsequent renewed setup merely for the purpose of implementing the described check of the path through-connection does not come into consideration.

In the prior art an error search given such nailed-up connections could only be undertaken in response to corresponding subscriber complaints, resulting in a relatively complicated fault elimination.

European Patent Application 87 108 196.4 discloses, first, that the information transmitted from the redundant switching network parts to the line side be immediately compared to one another bit-by-bit for the purpose of monitoring nailed-up connections and, second, that the information to be forwarded be provided with a parity bit and be subjected to a parity check after traversing all units of the periphery. Alternatively, the information in the line interface of the periphery coming from connected subscriber lines or transmission lines be provided with a parity bit and is likewise subjected to a parity check after traversing the peripheral units of the switching center. Such a testing strategy requires a relatively high outlay and is not especially suitable particularly given an organization of the switching center periphery into assemblies having a plurality of input and output terminals.

SUMMARY OF THE INVENTION

It is an object of the present invention to provide an improved method for monitoring existing telephone connections, particularly permanently switched telephone connections.

This object is achieved by comparing first information of a first time channel coming from said first switching network half to second information of a second time channel coming from said second switching network half, and continuing for a positive comparison of said first information and said second information; branching one of said first and second information coming from said first and second switching network halves, respectively, that is intended for forwarding, in a line side interface of the peripheral area pertaining to a connected subscriber line or truck line, mirroring said one information onto a separate time channel and transmitting said one information back to a network side interface at the central switching network of the peripheral area and comparing in said network side interface said received back information to said one information coming from the switching network; branching received information coming from the connected subscriber line or truck line in the line side interface from an original time channel in which the received information appears and conducting the branded information on the same connecting path as the original time channel in said separate time channel to said network side interface at the central switching network and comparing in said network side interface said branched information to said received information of the original time channel; and supplying, before every change to the steps pertaining to a further time channel, a check word in the network side interface at the central switching network and transmitting said check work in said separate time channel to the appertaining line side interface, mirroring said check word in said line side interface, transmitting said mirrored check word back to said network side interface at the central switching network, and comparing in the network side interface a pattern of said mirrored check word to a pattern of the supplied check word. In addition to a comparison of the information coming from the two redundant switching network halves, the information of both transmission directions per time channel are respectively transmitted in a separate time channel on a parallel path in addition to being transmitted in the appertaining, allocated time channel. They are then compared to the original information.

The branching into the separate time channel occurs in the line interface of the periphery for both transmission directions, in contrast whereto the comparison occurs in the interface at the switching network side of the periphery of the switching center. To this end, the information transmitted from the switching network in the direction to the connected subscriber lines or trunks is mirrored in the line interface and is transmitted back in the direction to the interface at the switching network side in the separate time channel. The information coming from the subscriber lines or trunks, by contrast, is branched from the transmission channel in the line interface and is likewise transmitted in the separate time channel to the interface at the switching network side.

In order to be able to also acquire central faults in the voice path that can affect all of the through-connected connections, a check bit pattern supplied by a test pattern generator is respectively supplied into the separate time channel in the interface of the switching network side between the respective test steps in the separate time channel pertaining to the individual time channels. The check list pattern is transmitted to the interface at the line side, is mirrored thereat and is in turn transmitted back to the interface at the switching network side where a comparison occurs to the check bit pattern that was transmitted.

In a development of the present invention, the time channel serving for the transmission of the signalling information during the course of the switching service is utilized as a separate time channel.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
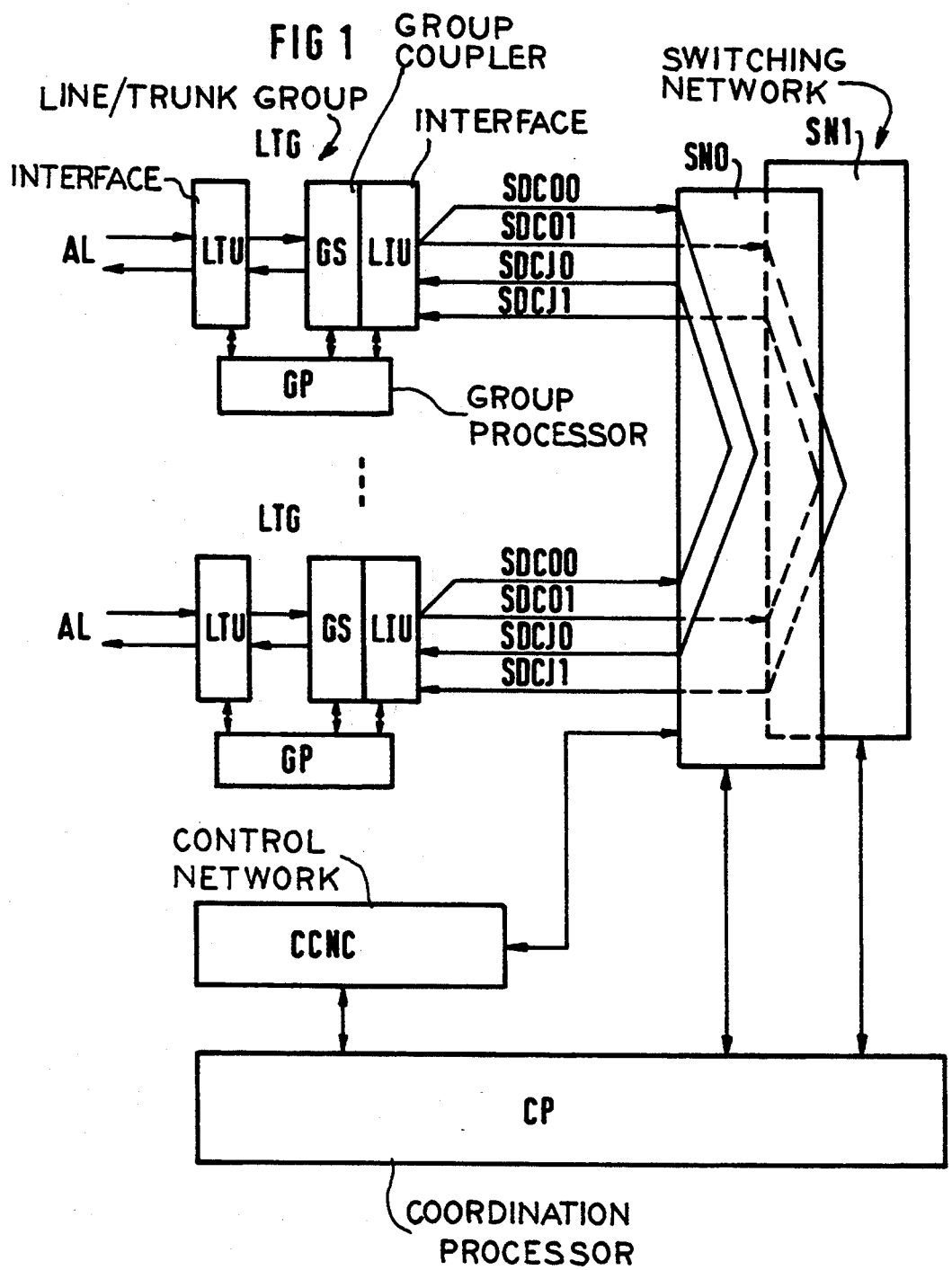
FIG. 1 is a block circuit diagram of a digital telephone switching center.

According to FIG. 1, a digital time-division multiplex telephone switching center is organized into a redundant switching network having the switching network halves SN0 and SN1, a line circuit area encompassing line/trunk groups LTG, as well as a network CCNC for controlling the central signalling channels. These component parts are directly or indirectly under the control of a coordination processor CP.

The line/trunk groups of the line circuit area are in turn organized into a group switching network, an interface LIU at the side of the central switching network, as well as a line interface LTU at the line side. The type of interface LTU at the line side is dependent on whether it serves the purpose of connecting trunk lines VL that are connected to other switching centers or of connecting subscriber lines AL. The group coupler GS and the interface LIU of the switching network side are preferably structurally united with one another. The parts of the line/trunk groups LTG are each respectively under the control of a group-associated group processor GP.

Connections via respectively one multiplex line SDC00 and SDC01 in one transmission direction and multiplex line SDCI0 and SDCI1 in the other transmission direction exist between the interfaces LIU of the central switching network side of the line/trunk groups LTG and each of the halves SN0 and SN1 of the central switching network.

In the case of a call setup leading via the central switching network, identical paths are through-connected in both switching network halves SN0 and SN1. However, only the information deriving from the one switching network half, the switching network half active at the moment, is forwarded from the interface LIU at the switching network side to the periphery. In the case of a disturbance of the active switching network half, a switching to the other switching network half occurs without interruption of the existing connections.

Figure 2:
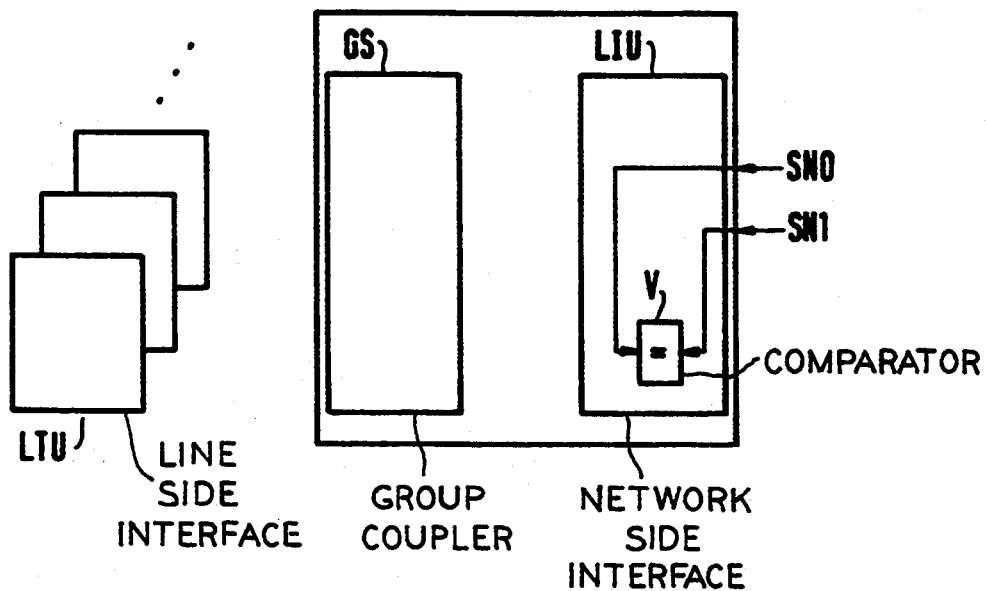
FIGS. 2 through 5 depict parts of the FIG. 1 circuit diagram with transmission paths and sub-equipment respectively emphasized for an individual method step of the method steps of the present invention.

FIG. 2, wherein the first method step of the method of the invention is illustrated, only indicates parts of the line circuit area of a telephone switching center, namely the group coupler GS and the interface LIU at the central switching network side of a line/trunk group LTG, and a number of interfaces LTU at the line side of a plurality of such line/trunk groups. As indicated in FIG. 2, a comparison of the information coming from the two switching network halves SN0 and SN1 is undertaken in a first step of the method of the present invention. This comparison is respectively undertaken in the time channel of an existing connection, particularly a nailed-up connection, with a comparator V that is a component part of the appertaining interface LIU at the central switching network side. As presented, both of these information derive from the same source information and must therefore agree with one another given a properly functioning connection.

Figure 3:
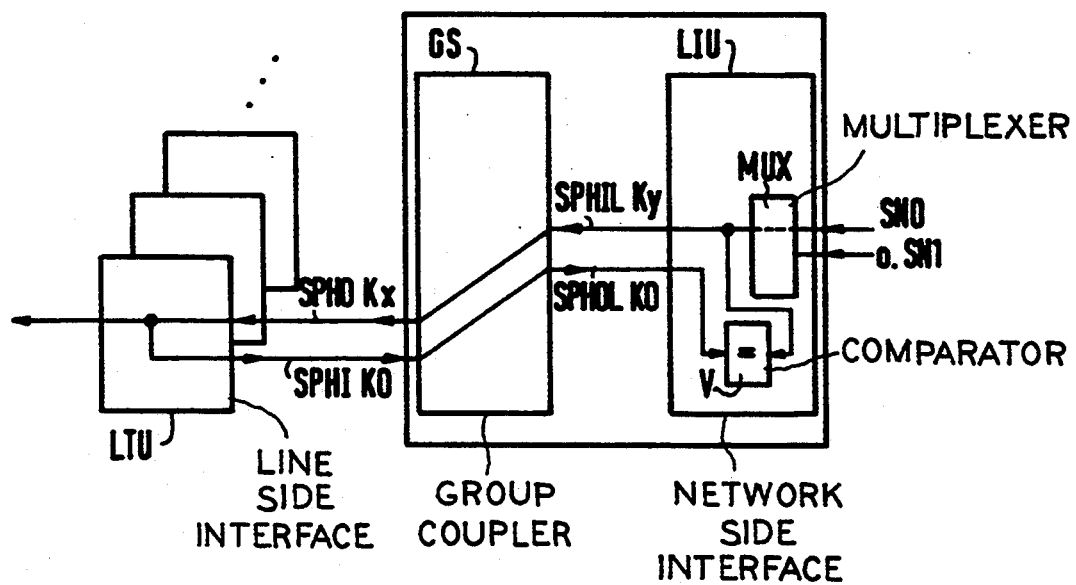

FIG. 3 illustrates the next step of the method of the present invention. In accord therewith, the information coming from the two switching network halves that is intended for forwarding (which is the information coming from the switching network half SN0 via the multiplexer MOX in FIG. 3) is transmitted to the appertaining line side interface LTU in the time channel Ky. The multiplex line SPHIL is used that connects the network side interface LIU and the group coupler GS, and the multiplex line SPH0 is and that connects the group coupler GS to the appertaining line side interface LTU.

A mirroring occurs in the line side interface LTU in the time channel K0 that is normally not used for the voice transmission, but is normally used for the transmission of signalling information. A return transmission to the interface LIU at the central switching network side occurs in this time channel KO on the same connecting path, namely via the voice multiplex lines SPHI and SPHOL of the opposite direction as well as via the group coupler GS, the aforementioned means V at the interface LIU of the central switching network side that undertakes a comparison to the aforementioned information supplied by the switching network part SN0 in the time channel Ky.

Figure 4:
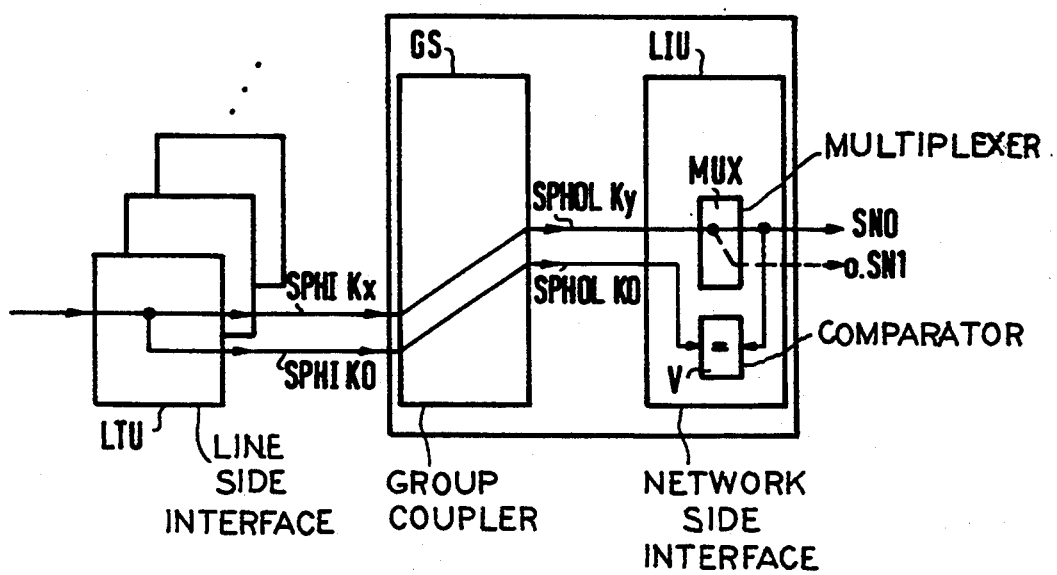

FIG. 4 illustrates a further step of the method of the present invention that is directed to the handling of the information coming from the connected subscriber lines or trunk lines AL.

As shown in FIG. 4, this information is branched in the line interface LTU from the time channel referenced Kx, wherein it was supplied on the separate time channel K0 and is transmitted from this point on the same transmission path as the content of the original channel Kx, i.e. on the multiplex line SPHI that connects the line interface LTU and group coupler GS. It is transmitted via the group coupler GS as well as the multiplex line SPHOL that connects this group coupler GS to the network side interface LIU. A comparison of the channel contents of the channels Kx and K0 occurs with the comparator V.

Those parts of the voice path having a channel-associated effect are monitored in the switching center on the basis of the above-described method steps.

Before a switch is undertaken to check a further time channel or another existing connection, a check of central parts of the voice path occur according to a concluding step of the method of the present invention.

Figure 5:
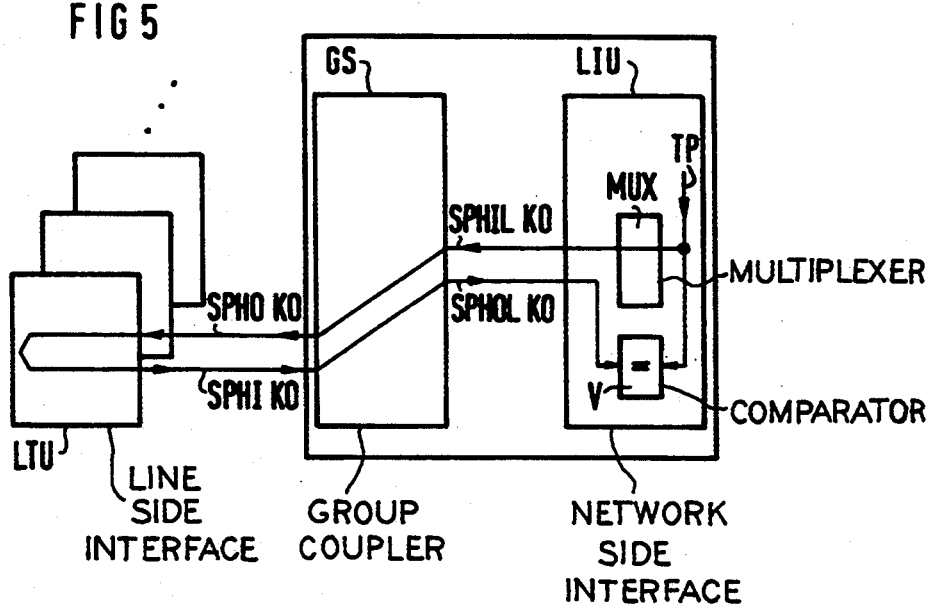

As shown in FIG. 5, a test pattern is supplied on the aforementioned time channel K0 for this purpose in the interface LIU at the central switching network side. This test pattern is transmitted to the line side interface LTU, is mirrored thereat into the time channel K0 of the opposite direction and is transmitted back to the interface LIU, where a comparison is made to the original check pattern.

The results of the aforementioned testing steps are respectively reported to the group processor GP of the appertaining line/trunk group LTG which, for a positive comparison, initiates the implementation of the next testing step and, for a negative comparison, initiates a repetition of the appertaining testing step. Upon confirmation of the error, an error message is sent to the coordination processor CP.

The initially described, call-associated cross office check COC is also implemented when setting up nailed-on connections.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for monitoring existing telephone connections in a digital time-division multiplex telephone switching center having a redundant central switching network having first and second switching network halves, and the switching center having component parts of a peripheral line circuit area, comprising the steps of:
    a) comparing first information of a first time channel coming from said first switching network half to second information of a second time channel coming from said second switching network half, and continuing to step b) for a positive comparison of said first information and said second information;
    b) branching one information of said first and second information, that is coming from said first and second switching network halves, respectively, and that is intended for forwarding, in a line side interface of the peripheral area pertaining to a connected subscriber line or trunk line, mirroring said one information onto a separate time channel, transmitting said mirrored information back to a network side interface at the central switching network of the peripheral area and comparing in said network side interface said received mirrored information to said one information coming from the switching network;
    c) branching received information coming from the connected subscriber line or trunk line in the line side interface from an original time channel in which the received information appears, conducting said branched received information on a same connecting path as the original time channel in said separate time channel to said network side interface at the central switching network and comparing in said network side interface said branched received information to said received information of the original time channel; and
    d) supplying, before repeating steps a), b) and c) for a further time channel, a check word in the network side interface at the central switching network and transmitting said check work in said separate time channel to the appertaining line side interface, mirroring said check word in said line side interface, transmitting said mirrored check word back to said network side interface at the central switching network, and comparing in the network side interface a pattern of said mirrored check word to a pattern of the supplied check word.

2. The method according to claim 1, wherein the separate time channel is a time channel serving for transmission of signaling information during switching service.

3. A method for monitoring existing telephone connections in a digital time-division multiplex telephone switching center having a redundant central switching network having first and second switching network halves, and the switching center at least having a network side interface operatively connected to a line side interface by a connection path, said connection path having time channels, said line side interface connected to a subscriber line or trunk line, comprising the steps of:
    a) comparing first information of a first time channel coming from said first switching network half to second information of a second time channel coming from said second switching network half, and continuing to step b) for a positive comparison of said first information and said second information;
    b) for one information of said first and second information that comes from the central switching network to the network side interface and that is conveyed in a predetermined time channel of the connection path to the line side interface, branching said one information in the line side interface, mirroring said one information onto a separate time channel of the connection path, transmitting said branched and mirrored information back to the network side interface in the separate time channel of the connection path, and comparing the mirrored information to the one information in the network side interface;
    c) for received information coming from the subscriber line or trunk line, branching the received information in the line side interface, mirroring said received information onto the separate time channel of the connection path, transmitting said received information to the network side interface in the predetermined time channel of the connection path and transmitting the mirrored received information to the network side interface in the separate time channel of the connection path, and comparing the mirrored received information to the received information in the network side interface;
    d) supplying, before repeating steps a), b) and c) for a further time channel, a check word in the network side interface and transmitting said check work in said separate time channel to the line side interface, mirroring said check word in said line side interface, transmitting said mirrored check word back to said network side interface, and comparing in the network side interface a pattern of said mirrored check word to a pattern of the supplied check word.

4. The method according to claim 3, wherein the separate time channel is a time channel serving for transmission of signaling information during switching service.

5. A method for monitoring existing telephone connections in a digital time-division multiplex telephone switching center having a redundant central switching network, and the switching center at least having a network side interface operatively connected to a line side interface by a connection path, said connection path having time channels, said line side interface connected to a subscriber line or trunk line, comprising the steps of:
    a) for network information that comes from the central switching network to the network side interface and that is conveyed in a predetermined time channel of the connection path to the line side interface, branching said network information in the line side interface, mirroring said network information onto a separate time channel of the connection path, transmitting said branched and mirrored information back to the network side interface in the separate time channel of the connection path, and comparing said mirrored information to said network information in the network side interface;

b) for received information coming from the subscriber line or trunk line, branching said received information in the line side interface, mirroring said received information onto the separate time channel of the connection path, transmitting said received information to the network side interface in the predetermined time channel of the connection path and transmitting the mirrored received information to the network side interface in the separate time channel of the connection path, and comparing the mirrored received information to the received information in the network side interface;

c) supplying, before repeating steps a) and b) for a further time channel, a check word in the network side interface and transmitting said check work in said separate time channel to the line side interface, mirroring said check word in said line side interface, transmitting said mirrored check word back to said network side interface, and comparing in the network side interface a pattern of said mirrored check word to a pattern of the supplied check word.

6. The method according to claim 5, wherein the separate time channel is a time channel serving for transmission of signaling information during switching service.

* * * * *